United States Patent
Locke

[15] 3,650,289
[45] Mar. 21, 1972

[54] SAFETY RELIEF VALVE
[72] Inventor: Joe B. Locke, Longview, Tex.
[73] Assignee: U.S. Industries, Inc., New York, N.Y.
[22] Filed: Feb. 5, 1970
[21] Appl. No.: 8,820

[52] U.S. Cl............................................................137/219
[51] Int. Cl.............................................F16k 1/06, F16k 1/12
[58] Field of Search............................137/219, 220, 221, 222

[56] References Cited

UNITED STATES PATENTS

| | | | |
|---|---|---|---|
| 1,550,717 | 8/1925 | Towle | 137/220 |
| 1,710,635 | 4/1929 | Wertz | 137/220 UX |
| 1,679,774 | 8/1928 | Larner | 137/219 |
| 2,938,533 | 5/1960 | Jensen et al. | 137/219 |
| 3,004,553 | 10/1961 | Chatfield et al. | 137/219 X |
| 3,260,275 | 7/1966 | Armstrong et al. | 137/219 |

*Primary Examiner*—Henry T. Klinksiek
*Attorney*—Hyer, Eickenroht, Thompson & Turner

[57] ABSTRACT

A safety relief valve comprises an outer annular body with a relief port through one end, an outlet at the other end, an annular seat about the flow passage through the relief port, and an inner body supported concentrically within and spaced from the outer body to provide an annular flow passage between the inner and outer bodies. The end of the inner body facing the relief port is spaced from the seat to provide an annular opening connecting the annular flow passage with the flow passage through the relief port, and a closure member is mounted on the inner body for reciprocation between a position seated on the seat to close communication between the flow passages and a position spaced from the seat to open communication therebetween.

6 Claims, 5 Drawing Figures

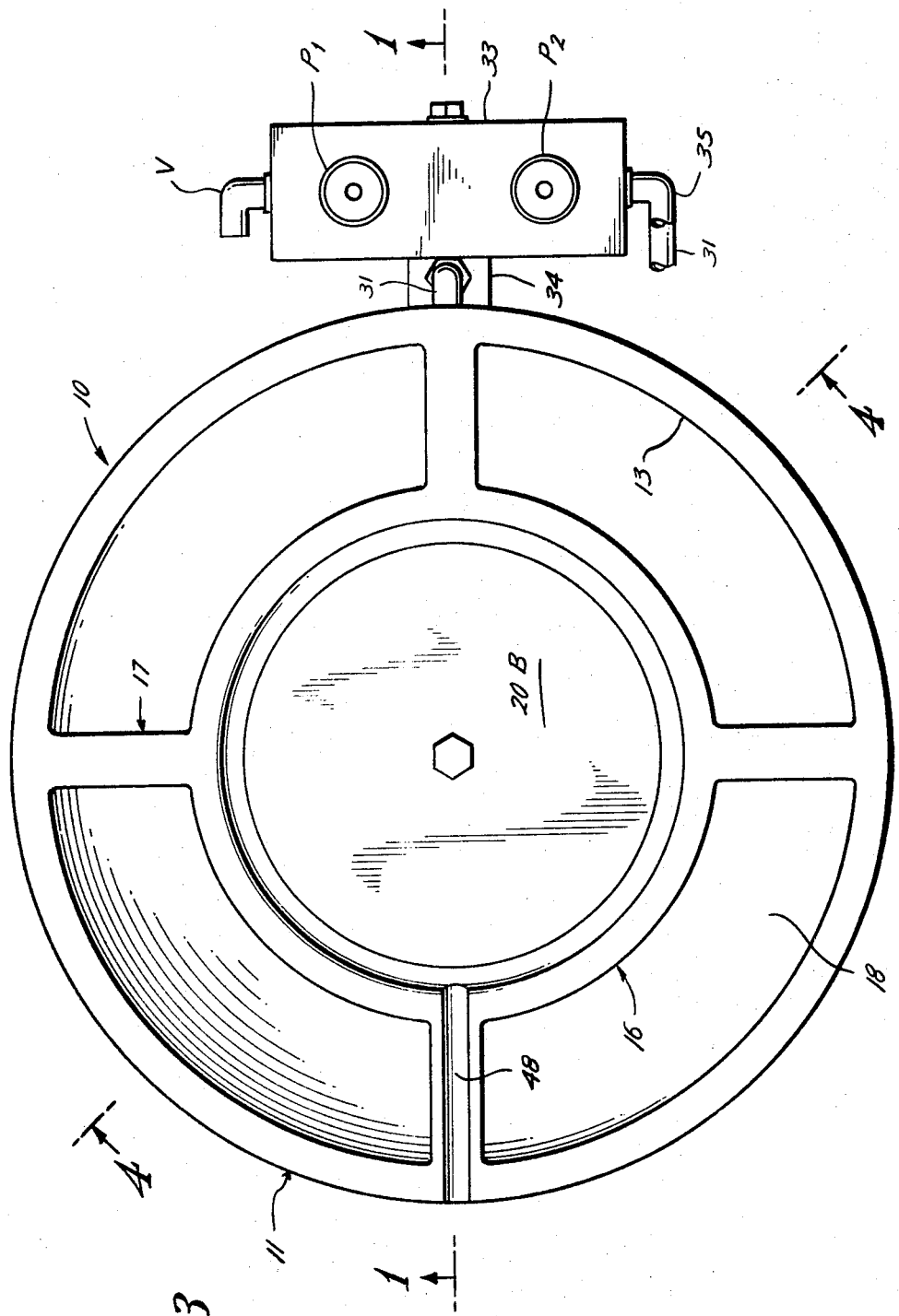

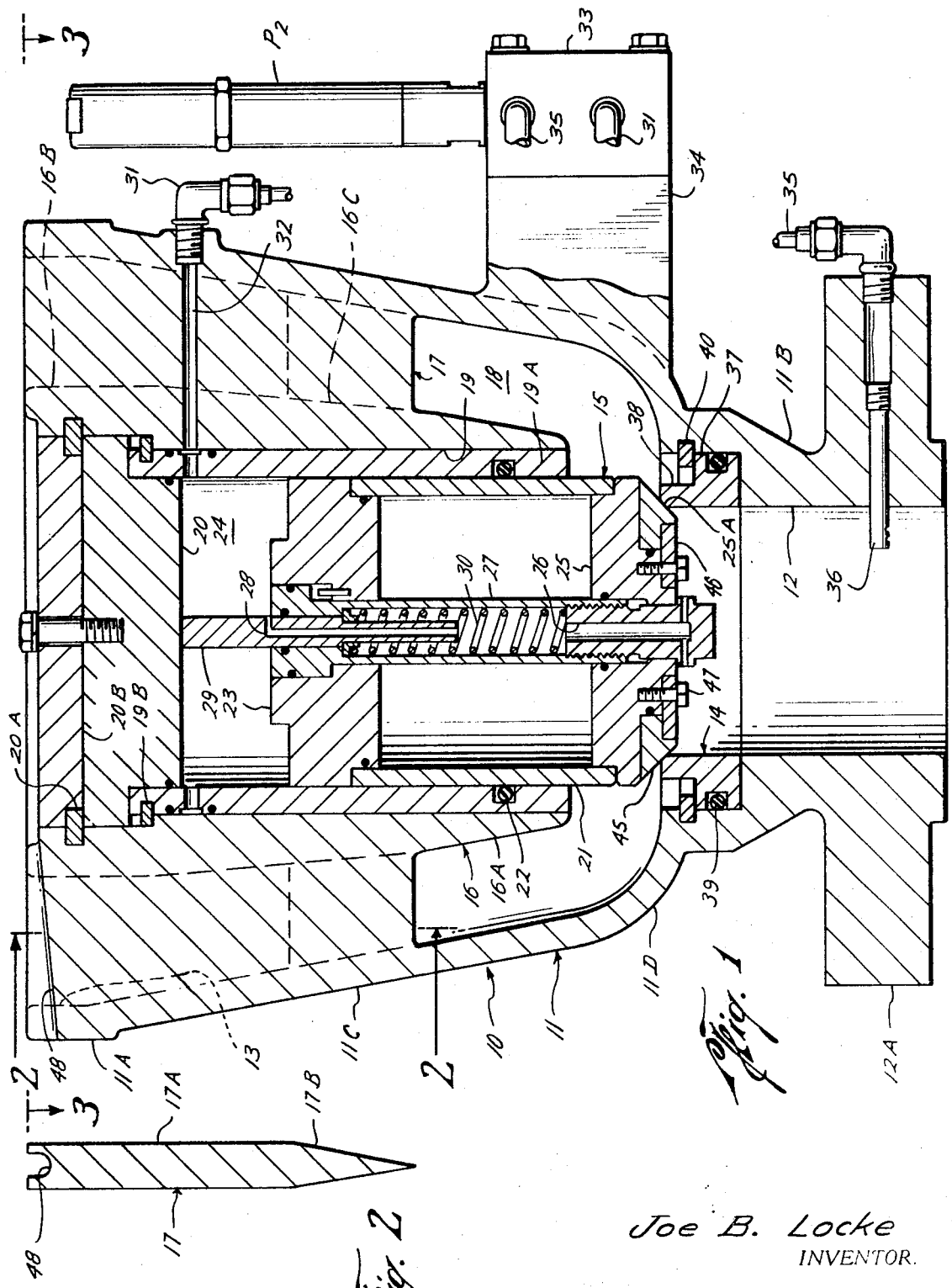

Joe B. Locke
INVENTOR.
BY Hyer, Eickenroht
& Thompson
ATTORNEYS

3,650,289

SAFETY RELIEF VALVE

This invention relates to valves for relieving high pressure gases from pipelines or other pressure vessels. More particularly, it relates to improvements in valves of this type in which the gas is adapted to be exhausted to atmosphere through one or more vertical stacks.

Prior valves of this latter type, such as the one shown and described in U.S. Pat. No. 2,759,488, have comprised a body having a relief port through one end for connection to the pressure vessel, a seat about the flow passage through the relief port, one or more outlets from the side of the body, and a closure member reciprocable between opened and closed position with respect to the seat for controlling communication between the flow passage through the port and the flow passage through each outlet from the valve. More particularly, in such prior valves, the closure member includes a piston reciprocable within a cylinder in the body to provide a pressure chamber between the piston and the head of the cylinder on the end of the body opposite the relief port. As also shown in U.S. Pat. No. 2,759,488, pilots mounted on the cylinder head are adapted to alternately vent the chamber so as to cause the closure member to open and pressurize the chamber so as to cause said member to close in response to predetermined high and low pressures, respectively, in the vessel.

Such valves have also included an exhaust assembly comprising an elbow having one end connected to each side outlet from the body, and a vertical stack connected to the other end of the elbow so as to direct high pressure exhaust gas away from surrounding persons and/or objects. Although a relief valve having only one side outlet minimizes the cost of materials and labor for the exhaust assembly, it nevertheless creates unbalanced forces on the valve due to side thrust in only one direction. On the other hand, although this side thrust may be balanced to some extent by a valve of this type having dual outlets, the cost for the exhaust assembly is considerably increased.

Furthermore, in both the single and dual outlet valves of this type, the gas to be relieved follows a path having two substantially right angle bends, one into the elbow and the other out of the elbow into the stack, thereby causing back pressure on the exhausted gas which reduces the capacity of the valve. Also, the gas is diverted from the relief port into one or more outlets of reduced cross-sectional area, thereby causing unequal gas pressures and flow rates and creating back pressures which prevent expansion of the gas during exhaust.

An object of this invention is to provide a relief valve of this general type which is less expensive to manufacture and which is more efficient.

Another object is to provide such a relief valve that requires neither elbows nor separate exhaust stacks.

A further object is to provide such a relief valve in which gas is exhausted through a path which has no sharp turns or other major obstructions to streamlined flow.

A still further object is to provide such a relief valve in which the gas is permitted to expand throughout its passage through the valve.

These and other objects are accomplished, in accordance with the illustrated embodiment of the invention, by a safety relief valve of such construction that the relieved gas passes from the relief port to an outlet from the other end of the body through an annular flow passage in the body of the valve itself, thereby eliminating the need for separate elbows and stacks and providing unrestricted flow of the relieved gas about the entire circumference of the seat. More particularly, the flow passage is free of sharp turns and other abrupt obstructions, and is of a cross-sectional area which is at least as large as that of the flow passage through the seat and which increases constantly in a direction toward the exhaust outlet. Thus, among other advantages, there is a minimum of back pressure on the exhausted gas which might otherwise reduce the valve's efficiency, and thus a maximum pressure drop.

In the drawings, wherein like reference characters are used throughout to designate like parts:

FIG. 1 is a longitudinal sectional view of a safety relief valve constructed in accordance with the present invention, and with the closure member in seated position;

FIG. 2 is a longitudinal sectional view of a rib for supporting the inner body of the valve within the outer body thereof, as seen along broken line 2—2 of FIG. 1;

FIG. 3 is a top plan view of the valve, as seen from broken line 3—3 of FIG. 1;

Figure 4:
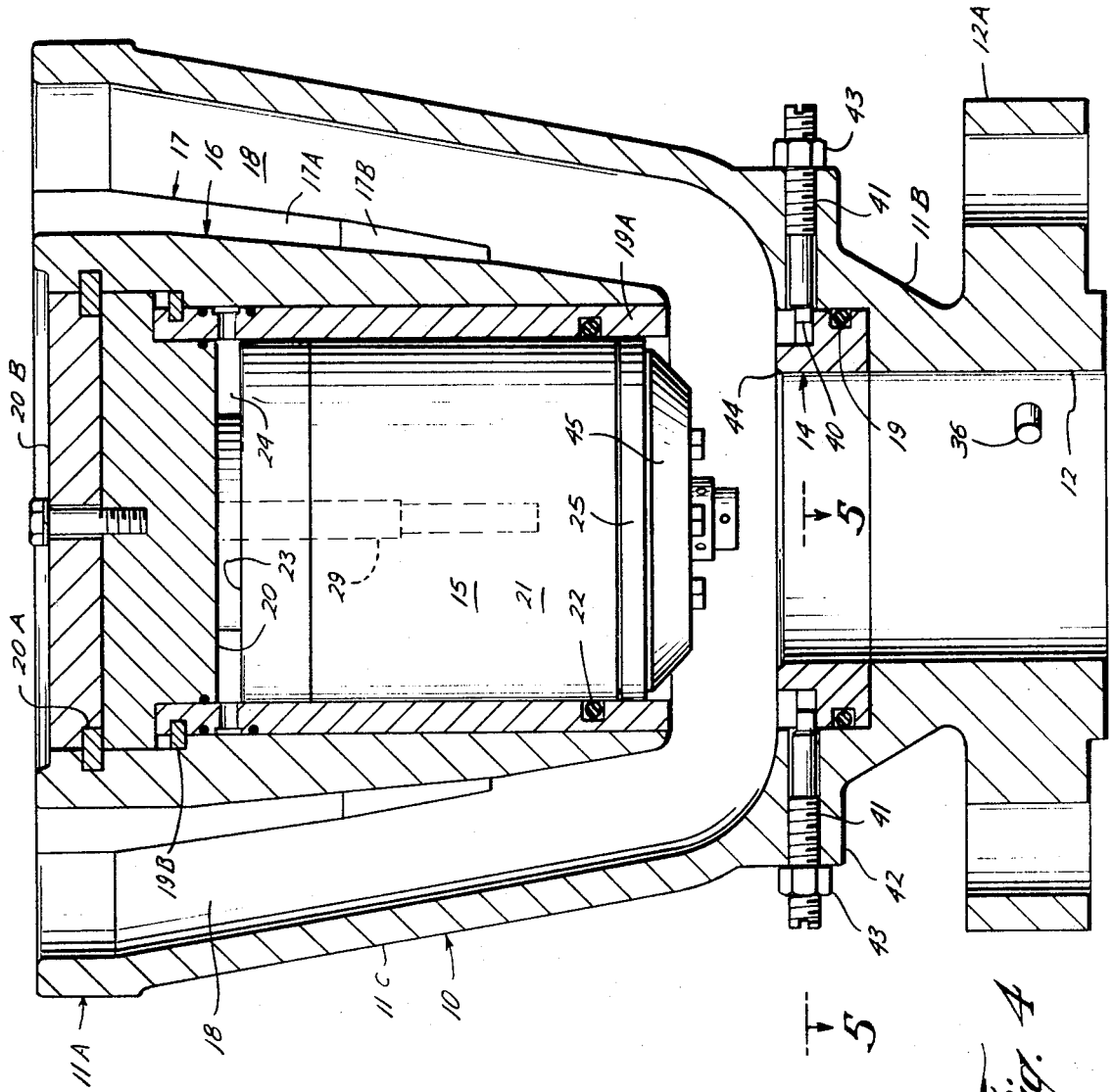
FIG. 4 is a longitudinal sectional view of the valve, as seen along broken line 4—4 of FIG. 3, but with the closure member shown in elevation and in unseated position.

With reference now to the details of the above-described drawings, the safety relief valve shown therein, and indicated in its entirety by the reference character 10, comprises an outer annular body 11 having a relief port 12 in one end and an outlet 13 in the other end coaxial with the relief port. The body is adapted to be mounted on and connected to an outlet from a vessel, such as a pipeline, by means of a flange 12A about the outer end of the port 12. Normally, the body 11 is so mounted on the vessel as to dispose the relief port 12 and outlet 13 vertically, so that surrounding persons or objects are protected from gas which is adapted to be exhausted through the outlet in a manner to be described to follow.

There is a seat 14 about the inner end of the flow passage through the relief port, and a closure member 15 is reciprocally mounted on an inner body 16 supported within the outer body 11 for movement into and out of seated positions on the seat along an axis coaxial with the seat and thus the relief port and outlet. More particularly, the inner annular body 16 is supported concentrically within the outer body 11 by ribs 17 which extend between the inner body and the inner side of the outer body and thereby provide an annular flow passage 18 between the bodies.

The lower end of the inner body 16 facing the relief port 12 is spaced from the seat 14 to provide an annular opening which connects the flow passage through the relief port 12 with the annular flow passage 18 between the inner and outer bodies. The upper end of the annular flow passage opens to the outlet 13, as illustrated, so that gas which is relieved from port 12 passes through the annular flow passage and out the outlet 13 for exhausting it to the atmosphere.

The inner body 16 is recessed to provide a cylinder 19 which is open at its lower end and coaxial with the seat 14, and the closure member 15 is reciprocable within the open end of the cylinder 19 between the seated position of FIG. 1, in which it is across the annular opening connecting the flow passage through the relief port 12 and the annular flow passage 18, and the unseated position of FIG. 4, in which it is above such opening to provide full communication between the flow passages.

As in prior safety relief valves of this general type, closure member 15 is caused to move between opened and closed positions automatically in response to predetermined high and low pressure conditions of the gas to be relieved. Thus, for example, the closure member is caused to move to the open position of FIG. 4 in response to a predetermined high pressure of the gas, and then to move to the closed position of FIG. 1 in response to a predetermined low pressure of the gas. As will be described to follow, these high and low pressures are sensed by a high pressure or relief pilot $P_1$ and a low pressure or blowdown pilot $P_2$, respectively, both of which are mounted on the side of outer body 11, as shows in FIGS. 1 and 3.

The upper end of the inner body is closed by a removable bonnet 20 to provide a head for the cylinder, and the closure member 15 comprises a hollow piston 21 sealably slidable within O-rings 22 carried within recesses in a liner 19A within the cylinder 19. A head 23 at the upper end of the piston defines a chamber 24 between it and the cylinder head, and a head 25 on its lower end provides a seating surface 25A for engaging the inner edge of seat 14 in the seated position of the closure member.

The closure member 15 and the high and low pressure pilots P₁ and P₂ are of substantially the same construction as those shown and described in connection with the safety relief valve of the aforementioned U.S. Pat. No. 2,759,488. Moreover, and as will be noted from the description to follow, they function in the same manner as their counterparts in such earlier patent, even though pilots are mounted on the valve 10 in a new and improved manner.

Thus, as will be apparent from FIG. 1, the effective cross-sectional area of the piston 21 is greater than the cross-sectional area of the inner diameter of the seat 14 engaged by closure member in its closed position. Consequently, when the pressure within the chamber 24 above the piston is equal to that within the relief port 12, the closure member will remain in seated position. On the other hand, when the pressure within the chamber 24 drops below that within relief port 12 to a sufficient extent, an unbalancing force will cause the closure member to move upwardly to the unseated position of FIG. 4.

In the closed position of the closure member shown in FIG. 1, the chamber 24 is connected with the relief port 12 be means of a port 26 through the lower head 25 of the piston, a sleeve 27 extending between the heads 23 and 25, and a port 28 through a valve member 29 slidable within the upper head. A spring 30 within the sleeve 27 urges the valve member upwardly to engage at its upper end with cylinder head 20, in which position the upper end of port 28 connects with the chamber 24, so that, as previously indicated, gas pressure from the relief port acts over the upper end of head 23 to hold the closure member closed.

However, upon a relatively rapid drop of the gas pressure within the chamber 24, the force due to gas pressure beneath the closure member will cause it to move upwardly to close the port 28 and thus prevent communication between the chamber 24 and the relief port 12. More particularly, and as described in the prior patent, the closure member 15 will continue upwardly under these conditions until it reaches its fully open position of FIG. 4, wherein the upper head of the piston engages the bonnet 20.

This drop in the pressure within chamber 24 is caused by venting of the high pressure pilot P₁, which is connected to the pressure chamber by a conduit 31 connected at one end to the outer end of a port 32 extending from the chamber 24 through one of the supporting ribs 17. Thus, each of the pilots is mounted on a header or manifold 33 releasably connected to a boss 34 on the side of body 11, and the opposite end of the conduit 31 connects with a lower portion of the header to admit gas in the chamber 24 to the high pressure pilot P₁. As shown and described in the prior patent, the pilot is of such construction that it opens to vent the gas in the chamber 24 through V on the side of the header opposite the connection of conduit 31 therewith, and thus permit the closure member to move to open position, when such gas reaches a predetermined high value. Upon venting, the pilot P₁ will return to closed position so that, with the port 28 closed, the closure member will remain in open position.

A conduit 35 connects at one end with a probe 36 in the relief port 12 and at the other end with an upper portion of the header 33 above the connection of conduit 31, so as to admit gas in the relief port to the low pressure pilot P₂. As also shown and described in the aforementioned prior patent, the low pressure pilot is of such construction as to open, when the gas pressure in the relief port reaches a predetermined low value, to communicate the conduit 35 with the chamber 24 through the header 33 and the conduit 31, and thus gas pressure in the flow port to the chamber 24. Since the same pressure is beneath the closure member, the downward force on the closure member due to this pressure, together with the force due to the spring 27, will return the closure member to its seated position of FIG. 1.

Inasmuch as reference may be had to the aforementioned patent, and further since the broad aspects of the present invention contemplate other means for causing opening and closing of the closure member, further details of the construction of the closure member and the pilots as well as their interrelation is believed unnecessary. Thus, it is sufficient to note that, as compared with the valve and pilots of U.S. Pat. No. 2,759,488, wherein the header is built into the cylinder head, the valve 10 of the present invention provides a convenient side mounting for the pilots and the header 33 which enables the use of different sizes and shapes of headers.

Turning now to other details of the novel features of the overall valve 10, the outer body 11 is shown in FIGS. 1 and 4 to comprise an upper cylindrical portion 11A through which the outlet 13 is formed, a lower generally cylindrical portion 11B through which the flow port 12 is formed, and an intermediate conical portion 11C which is downwardly divergent on a relatively steep taper from the upper cylindrical portion 11A to connect at its lower end with the upper end of the lower cylindrical portion 11B by a curved portion 11D.

The inner diameter of the upper end of the lower cylindrical portion 11B is enlarged at 37 to receive a metal ring 38 providing the seat 14. An O-ring 39 is carried in a recess in the outer diameter of the seat ring 38 to seal with respect to the enlarged diameter portion 37. The ring 38 may be moved through the cylinder into and out of its seated position of FIGS. 1 and 4 upon removal of the bonnet 20 from the upper end of inner body 16 and the liner 19A from within the cylinder 19. As shown, the liner is supported by a ring 19B about its upper end which seats on a shoulder about the upper end of the cylinder, the bonnet is removably held on top of the liner by a split ring 20A, and a cap 20B covers the bonnet and split ring. Suitable seal rings on the bonnet and liner sealably close the upper end of the chamber 24.

Figure 5:
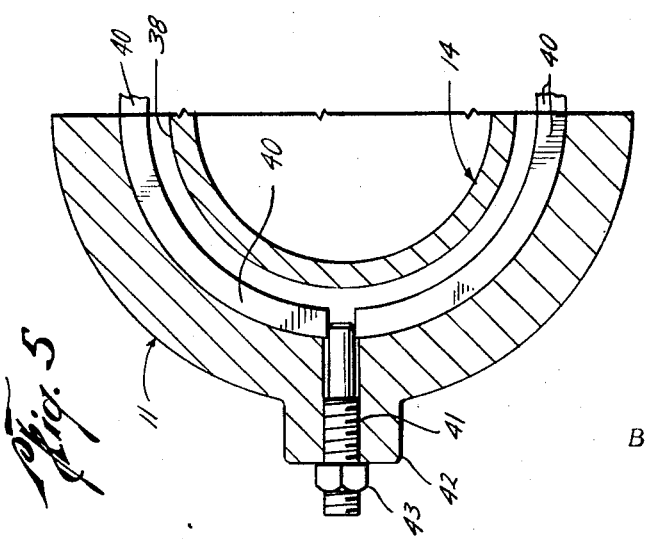
FIG. 5 is a partial cross-sectional view of the valve, as seen along broken line 5—5 of FIG. 4.

More particularly, the seat ring 38 is removably held in seated position by a plurality of locking segments 40 which are carried within an annular slot above portion 37 and held in seat retaining positions by means of pins 41 threadedly received within holes through bosses 42 disposed about the outer side of the outer body 11. Thus, as will be appreciated from FIGS. 4 and 5, the pins 41 may be moved radially inwardly into engaging positions between the side edges of adjacent pairs of locking segments so as to cause the side edges of such pairs to engage and thereby prevent their inward movement out of locking position. The pins are held in their inner position by means of lock nuts 43, which may be released to permit retraction of the pins 41, at which time the segments 40 may be moved inwardly out of the annular slot and into positions permitting removal of the seat ring.

The outer side of the inner body 16 includes a lower conical portion 16A which is downwardly convergent and an upper cylindrical portion 16B. These upper and lower portions of the outer side of the inner body are connected by a downwardly convergent conical portion 16C which is on a somewhat steeper taper than the lower conical portion 16A. The ribs 17 each include an upper portion having parallel opposite sides 17A and a lower portion having downwardly convergent opposite sides 17B, which merge at the lower end of the rib, as best shown in FIG. 2.

As shown in each of FIGS. 1 and 4, the outer portion of the lower side of the lower head 25 of the piston 21 of the closure member 15, which provides seating surface 25A, is conical and converges downwardly toward a flat, circular central portion concentric with the relief port 12. In the seated or closed position of the closure member 15, the seating surface 25A on this conical portion seats upon a correspondingly tapered surface 44 on the inner upper corner of the seat ring 38. The central portion of the lower side of head 25 includes a removable insert 45 retained within an annular recess on the lower side of head 25 by means of a plate 46 secured to the head by means of bolts 47.

In the open position of the closure member, the conical portion of the lower side of the head 25 is generally on the same vertical level as the lower end of the inner body 16 to provide a full annular opening connecting the relief port 12 with the annular flow passage. As previously mentioned, and in accordance with one of the novel features of the present invention, the cross-sectional area of this annular opening is at least as large as that of the flow passage through the relief port, and the cross-sectional area of the lower end of the annular flow passage 18 is at least as large as that of the annular opening and constantly increases in a direction from its lower end connecting with the annular opening and its upper end connecting with the outlet 13.

As shown in FIGS. 1 and 4, the lower conical portion 16A of the inner body 16 and the conical portion 11C of the outer body 11 are on generally the same taper. Thus, since both are upwardly divergent, the cross-sectional area of the portion of the flow passage 18 between them will increase in a direction from the relief port toward the outlet. Also, the tapers of the rib sides 17B and the body portion 11C and 16C are so selected as to provide a cross-sectional area of the annular flow passage 18 between them which continues to increase in a direction toward the outlet 13.

The upper end of the annular flow passage opens into an annular space forming the outlet 13 between the cylindrical portion 16B of the inner body and the cylindrical portion 11A of the outer body. In this portion of the valve, the opposite sides 17A of the upper portion of the ribs 17 are parallel so as not to compress the expanded gas.

As will also be apparent from the drawings, the flow passage 18 is free of sharp bends and major obstructions which might cause excessive pressure drops of the gas during exhaust through the valve 10. That is, the exhausting gas must turn corners of only relatively small acute angles during travel from the relief port 12 to the outlet 13. Furthermore, practically all corners between successive sections of the flow passage 18 are rounded and streamlined. Also, of course, the exhaust of the gas is accomplished through an opening extending 360° about the circumference of the seat 14 about the relief port.

The top of at least one rib 17 is provided with a groove 48 to permit liquid which may accumulate above the cap 20B to drain off.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A safety relief valve, comprising an outer annular body having a relief port through one end, an outlet at the other end, and an annular seat about the relief port, the portion of the inner side of the outer body intermediate the seat and the outlet being radially outwardly enlarged, an inner body, means supporting the inner body generally concentrically within the enlarged portion and with one end thereof spaced from the seat to provide an annular flow passage between the inner body and the inner side of the outer body extending from said one end to said outlet and having a cross-sectional area which is at least as large as the cross-sectional area of the flow passage through the seat and which increases constantly in a direction toward the outlet, and a closure member mounted on the inner body for reciprocation between a position seated on said seat to close communication between the flow passage through the seat and the annular flow passage and a position spaced from the seat in which it forms a substantial continuation of said one end of the body and provides an annular opening connecting the flow passage through the seat with the annular flow passage which has a cross-sectional area at least as large as the flow passage through the seat and no larger than the cross-sectional area of the smaller end of the annular flow passage.

2. A safety relief valve of the character defined in claim 1, wherein each of the inner body and the inner side of the outer body flares outwardly from the smaller end of the annular flow passage to substantially the outlet therefrom.

3. A safety relief valve of the character defined in claim 1, wherein said supporting means comprises radial ribs having ends nearer the smaller end of the annular flow passage which flare outwardly in a direction toward the outlet.

4. A safety relief valve of the character defined in claim 3, wherein each of the inner body and inner side of the outer body flares outwardly from the smaller end of the annular flow passage to substantially the outlet therefrom.

5. A safety relief valve of the character defined in claim 4, wherein a portion of the outer side of the inner body intermediate the flared portion thereof and the outlet is cylindrical.

6. A safety relief valve of the character defined in claim 1, wherein the inner body has a cylinder therein and the closure member has a piston which is sealably slidable within the cylinder to form a pressure chamber therein, and a port extends through one of said ribs and said inner and outer bodies to connect the pressure chamber with the exterior of the valve.

* * * * *